US012718575B2

(12) United States Patent
Hosseini

(10) Patent No.: US 12,718,575 B2
(45) Date of Patent: Aug. 25, 2026

(54) SYSTEM AND METHODS FOR CAR COLOR DETECTION USING CAR MAKE LOGO DETECTION

(71) Applicant: HANWHA VISION CO., LTD., Seongnam-si (KR)

(72) Inventor: Arian Hosseini, Sunnyvale, CA (US)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 18/755,385

(22) Filed: Jun. 26, 2024

(65) Prior Publication Data

US 2026/0004585 A1 Jan. 1, 2026

(51) Int. Cl.

| | |
|---|---|
| ***G06V 20/52*** | (2022.01) |
| ***G06V 10/25*** | (2022.01) |
| ***G06V 10/26*** | (2022.01) |
| ***G06V 10/56*** | (2022.01) |
| ***G06V 10/74*** | (2022.01) |

(Continued)

(52) U.S. Cl.

CPC .............. *G06V 20/52* (2022.01); *G06V 10/25* (2022.01); *G06V 10/267* (2022.01); *G06V 10/56* (2022.01); *G06V 10/761* (2022.01); *G06V 10/764* (2022.01); *G06V 10/993* (2022.01); *G06V 20/60* (2022.01); *H04N 7/183* (2013.01); *G06V 2201/08* (2022.01); *G06V 2201/09* (2022.01); *G06V 2201/10* (2022.01)

(58) Field of Classification Search

CPC ........ G06V 20/52; G06V 20/60; G06V 10/25; G06V 10/56; G06V 10/267; G06V 10/761; G06V 10/764; G06V 10/993; G06V 2201/08; G06V 2201/09; G06V 2201/10; H04N 7/183

See application file for complete search history.

(56) References Cited

U.S. PATENT DOCUMENTS

2009/0028425 A1* 1/2009 Cavallaro ............ H04N 5/2723 348/157

2014/0056520 A1* 2/2014 Rodriguez Serrano ...................... G06V 10/771 382/173

(Continued)

FOREIGN PATENT DOCUMENTS

| | | | | |
|---|---|---|---|---|
| KR | 20170094863 A * | 8/2017 | ......... | H04L 67/2871 |
| WO | WO-2020151172 A1 * | 7/2020 | ............. | G06F 18/00 |
| WO | WO-2024091226 A1 * | 5/2024 | ............... | G06T 7/90 |

*Primary Examiner* — Peet Dhillon

(74) *Attorney, Agent, or Firm* — Sughrue Mion, PLLC

(57) ABSTRACT

Disclosed is a surveillance camera capable of detecting a color of a vehicle using vehicle logo detection. This specification describes a method that, instead of processing an entire image of a vehicle, detects the vehicle's logo and expands a bounding box of the detected logo to analyze a dominant color within the expanded bounding box for higher accuracy. During a dominant color analysis process, color correction may be performed based on metadata, environmental factors, and a lighting condition. In addition, more accurate vehicle color detection may be achieved through color distance measurement. According to this specification, at least one of a surveillance camera, an autonomous vehicle, a user terminal, and a server may be associated with an Artificial Intelligence (AI) module, a robot, an Augmented Reality (AR) device, a Virtual Reality (VR) device, and a 5G service.

19 Claims, 12 Drawing Sheets

(51) Int. Cl.

| | |
|---|---|
| ***G06V 10/764*** | (2022.01) |
| ***G06V 10/98*** | (2022.01) |
| ***G06V 20/60*** | (2022.01) |
| ***H04N 7/18*** | (2006.01) |

(56) References Cited

U.S. PATENT DOCUMENTS

2024/0153126 A1* 5/2024 Pribble ..................... G06T 7/62
2025/0131733 A1* 4/2025 Wilf .......................... G06T 7/20

* cited by examiner

SYSTEM AND METHODS FOR CAR COLOR DETECTION USING CAR MAKE LOGO DETECTION

BACKGROUND

1. Field

The present disclosure relates to computer vision, and more specifically, to a method for detecting a vehicle color using logo data of a vehicle.

2. Related Art

With the recent increase in crimes involving vehicles, interest in vehicle information recognition has been growing. If vehicle information can be recognized from images acquired through surveillance cameras installed on highways or regular roads, it can be effective in tracking the movement routes of criminals.

If an intelligent control system for real-time monitoring is established in an integrated control center of CCTVs, it may be helpful in recognizing vehicle information through surveillance cameras. Among various attributes of an image, color information is one of the important pieces of information. If colors can be classified or recognized in an image, it can be widely applied in various fields such as image segmentation, object detection, and object tracking. Therefore, using color information of a vehicle is one of the methods for recognizing vehicle information.

To determine a colored region of a vehicle, conventional technologies mostly involve detecting similar patterns and colored regions in the front part of a vehicle image acquired from fixed CCD cameras installed on roads, such as the vehicle hood in passenger vehicles and the front image of trucks and buses. In addition, the rear of the vehicle includes elements like bumpers, collision prevention devices, cargo compartments, and spare wheels, making it difficult to accurately distinguish the colored region. In other words, conventional methods for detecting a vehicle color require data processing of the entire image recognized as a vehicle, leading to high computational costs and potentially lower accuracy.

SUMMARY

The present disclosure provides a vehicle color detection method that focuses on a vehicle logo region as a colored region for determining a color of a vehicle, thereby increasing efficiency and accuracy.

In addition, according to an embodiment of the present disclosure, the vehicle loco area is expanded to a predetermined range and color feature are detected in the expanded area. Additionally, the vehicle color detection method increase reliability by more accurately reflecting an image capturing situation by integrating color correction based on metadata related to image capturing into the vehicle color detection process.

Objects of the present disclosure are not limited to the aforementioned objects, and other objects not mentioned may be clearly understood by those skilled in the art from the detailed description of the present disclosure.

In one aspect, there is provided a surveillance camera including: an image sensor configured to acquire an image including a vehicle; and a processor configured to define a first region including a logo by detecting the logo of the vehicle from the image, define a second region by expanding the first region to include a body of the vehicle, extract a dominant color of a vehicle body included in the second region, and compare the extracted dominant color with color reference classes to acquire a color of the vehicle.

The surveillance camera may further include a memory configured to store a pre-trained logo detection model, and the processor may detect the logo through the logo detection model.

The logo may include at least one of a text or symbol representing a manufacturer of the vehicle, and the processor may extract a bounding box configured to fit a boundary of the logo as the first region, and extract a second bounding box by extending at least one of a horizontal length or vertical length of the first bounding box.

The processor may extract the second region by selectively extending at least one of a horizontal length or vertical length of the bounding box based on a horizontal and vertical ratio of the logo.

When the first region including the detected logo is positioned at a grill of a front part of the vehicle, the processor may define the second region by expanding the first region vertically.

When the logo is a plurality of logos detected at a plurality of areas, the processor may select any one of the logos based on detected positions of the logos and define the first region corresponding to the selected logo, and a body region of the vehicle is assigned with a higher priority compared to a window region, a wheel region, and a grille region of the vehicle.

When the detected logo is a plurality of logos detected at different sides of a body of the vehicle, the processor may compare colors corresponding to the plurality of logos and acquired in the second region, and when, according to a result of the comparison, it is determined that the acquired colors are out of color consistency, the processor may determine that there is a difference in lighting effects on the body of the vehicle where the plurality of logos is detected, and then the processor may perform color correction based on the lighting effects.

The processor may crop the image to include the second region and determines a majority RGB value within a cropped region.

The processor may perform color correction on the determined majority RGB value based on metadata related to image capturing, and the metadata may include at least one of the following: capture metadata comprising time and location information indicating when and where the image is captured, environmental factors including weather information, a lighting condition, or a user's feedback on the determined color of the vehicle.

The processor may determine that a reference color closest to a corrected RGB value, which is corrected through a color distance metric, in the color reference classes is a color of the vehicle.

The processor may extract the dominant color of each of a plurality of predefined regions of interest (ROIs), assign weights to the ROIs based on characteristics of the respective ROIs, and combine dominant colors corresponding to the weighted ROIs to acquire a color of the vehicle.

The plurality of ROIs may include at least one of a hood, roof, or side panels of the vehicle.

The weights may be assigned differently according to an area occupied by each of the plurality of ROIs on the body of the vehicle.

The surveillance camera may further include a memory configured to store a color classification model predefined for each vehicle manufacturer, and the processor may use, as a color reference class, a color classification model for the vehicle's manufacturer matching the detected logo.

The surveillance camera may further include a communication unit, and the processor may transmit an image including the vehicle to an image management server through the communication unit and receive classified color information of the vehicle from the image management server.

Mapping information between logo of the vehicle and the acquired color of the vehicle may be stored in a cache memory of the surveillance camera, and the processor may acquire color information of the vehicle using the cached mapping information for different vehicles of the same vehicle model.

When failing to detect a logo of the vehicle in the image, the processor may extract at least one predefined region of interest (ROI) through random sampling and acquires a color of the vehicle based on the extracted ROI, and wherein the predefined ROI comprises at least one of an edge area, hood, roof, or side panels of the body of the vehicle.

In another aspect, there is provided a method for detecting a color of a vehicle using vehicle logo detection, the method including: acquiring an image including the vehicle; detecting the logo of the vehicle in the image and extracting a first bounding box including the logo; extracting a second bounding box to include at least a portion of a vehicle body by expanding the first bounding box based on a horizontal axis; cropping a vehicle image in the second bounding box, extracting a dominant color of the vehicle body from the cropped region, and comparing the extracted dominant color with color reference classes; and determining that a reference color closest to the dominant color in the color reference classes is a color of the vehicle.

The logo of the vehicle may be detected through a logo detection model, and the logo detection model may be trained and stored in a memory to receive training data such as the vehicle's manufacturer, shape, brand, and color and detect a logo in an image including the vehicle.

The method may further include: determining a majority RGB value of the cropped vehicle image in the second bounding box; performing color correction on the determined majority RGB value based on capture metadata including time and location information indicating when and where the image is captured, environmental factors including weather information, a lighting condition, and a user's feedback on the determined color of the vehicle; and determining that a reference color closest to a corrected RGB value, which is corrected through a color distance metric, in the color reference classes is a color of the vehicle.

The color distance metric may include a Euclidean distance or a distance between colors in a space of hue, saturation, and value (HSV).

In yet another aspect, there is provided a surveillance camera device including: a memory having at least one program stored therein; and a processor configured to execute the program. The program executes instructions to: to detect a vehicle from an acquired image; to detect a logo of the vehicle from the detected vehicle; to extract a bounding box including the logo of the detected vehicle; to acquire an expanded box by extending a length of the bounding box in a horizontal direction; to crop the image based on the extended bounding box and determine a majority RGB value in a cropped region; to perform color correction by adjusting the determined RGB value based on at least one of a capture time, a capture location, weather, and a nearby object associated with the image; and to determine that a reference color closest to the corrected RGB value in color reference classes is the color of the vehicle.

According to an embodiment of the present disclosure, in a method for detecting a vehicle color based on a vehicle logo, it is possible to detect a vehicle color more quickly and efficiently by focusing only on the vehicle logo and an expanded bounding box, without processing an entire vehicle image.

In addition, according to an embodiment of the present disclosure, it is possible to provide more accurate color representation by capturing a wider portion of a vehicle body in consideration of the expanded bounding box.

In addition, according to an embodiment of the present disclosure, it is possible to easily integrate with an existing color classification system by comparing a detection result with predefined standardized color reference classes.

In addition, according to an embodiment of the present disclosure, it is possible to improve the accuracy of color comparison and determine the vehicle color more precisely by measuring color distance, such as Euclidean distance or HSV.

In addition, according to one embodiment of the present disclosure, it is possible to enhance and adjust an RGB value by performing color correction based on capture metadata, environmental factors, and a lighting condition, thereby improving the accuracy of vehicle color detection.

In addition, according to an embodiment of the present disclosure, it is possible to apply the method to a wide range of vehicle color detection applications as the method can be applied to various vehicle models and body types.

In addition, according to an embodiment of the present disclosure, it is possible to provide a cost-effective solution for vehicle color detection by reducing the need for manually detecting vehicle color or using expensive color measurement equipment.

Effects of the present disclosure are not limited to the aforementioned effects, and other effects not mentioned may be clearly understood by those skilled in the art from the description below.

BRIEF DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

The accompanying drawings, which are included as part of the detailed description to aid understanding of the present disclosure, provide embodiments of the present disclosure and together with the detailed description explain technical features of the present disclosure.

DESCRIPTION OF EXAMPLE EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components should not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Figure 1:
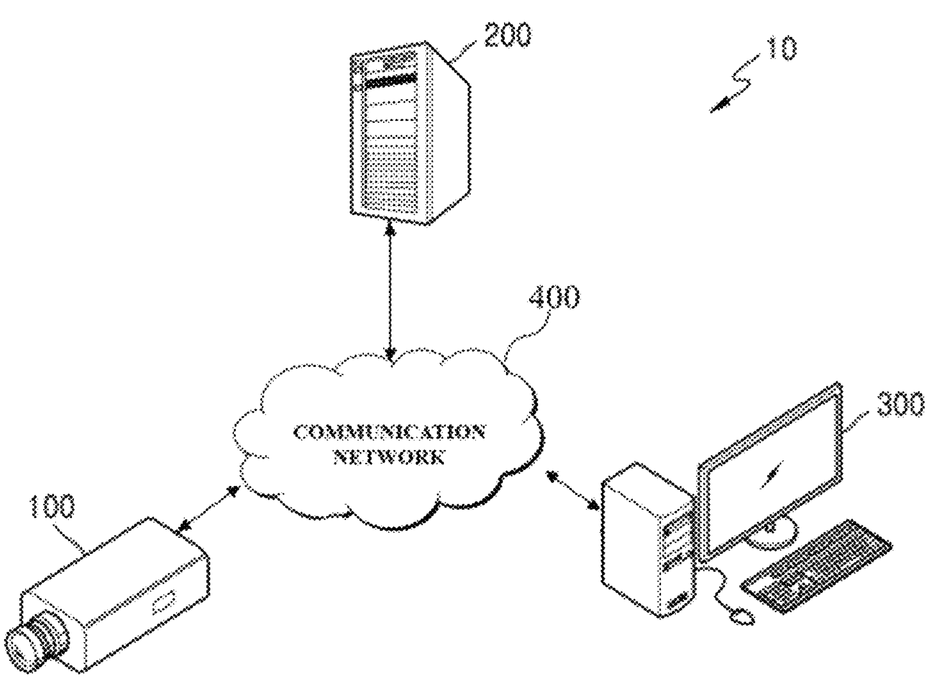
FIG. 1 is a diagram for explaining a surveillance camera system for implementing a method for detecting a vehicle color through a vehicle logo according to an embodiment of the present disclosure.

FIG. 1 is a diagram for explaining a surveillance camera system for implementing a method for detecting a vehicle color through a vehicle logo according to an embodiment of the present disclosure.

Referring to FIG. 1, a surveillance camera system 10 according to an embodiment of this disclosure may include an image capture device 100 and an image management server 200. The image capture device 100 may be an electronic imaging device disposed at a fixed location in a specific place, may be an electronic imaging device that may be moved automatically or manually along a predetermined path, or may be an electronic imaging device that may be moved by a person or a robot. The image capture device 100 may be an IP (Internet protocol) camera connected to the wired/wireless Internet and used. The image capture device 100 may be a PTZ (pan-tilt-zoom) camera having pan, tilt, and zoom functions. The image capture device 100 may have a function of recording a monitored area or taking a picture. The image capture device 100 may have a function of recording a sound generated in a monitored area. When a change, such as movement or sound, occurs in the monitored area, the image capture device 100 may have a function of generating a notification or recording or photographing. The image capture device 100 may receive and store a trained object recognition learning model from the image management server 200. Accordingly, the image capture device 100 may perform an object recognition operation using the trained object recognition learning model.

The image management server 200 may be a device that receives and stores an image as it is captured by the image capture device 100 and/or an image obtained by editing the image. The image management server 200 may analyze the received image to correspond to the purpose. For example, the image management server 200 may detect an object in the image using an object detection algorithm. An AI-based algorithm may be applied to the object detection algorithm, and an object may be detected by applying a pre-trained artificial neural network model.

Meanwhile, the image management server 200 may store various learning models suitable for image analysis purposes. In addition to the aforementioned learning models for object detection, a model capable of acquiring a moving speed of a detected object may be stored.

Here, the trained learning models may include a vehicle logo detection model. The vehicle logo detection model may be a model trained using a known method. According to one embodiment, the vehicle logo detection model may be trained and stored in memory to receive training data such as the vehicle's manufacturer, shape, brand, color, and the like and detect a logo in an image including a vehicle. To train the vehicle logo detection model, the neural network may use the most popular vehicle logo dataset, and other logos may be added as well. Here, the vehicle logo dataset may include data acquired through surveillance cameras installed on the roads.

In addition, the trained models may include a dominant color detection model, a color correction model, and a color distance model. As described above, various color analysis model for vehicle color detection according to an embodiment of the present disclosure may comprise a pre-trained models. The pre-trained models may include models trained by known learning methods for color detection.

In addition, the image management server 200 may analyze the received image to generate metadata and index information for the corresponding metadata. The image management server 200 may analyze image information and/or sound information included in the received image together or separately to generate metadata and index information for the metadata.

An surveillance camera system 10 may further include an external device 300 capable of performing wired/wireless communication with the image capture device 100 and/or the image management server 200.

The external device 300 may transmit an information provision request signal for requesting to provide all or part of an image to the image management server 200. The external device 300 may transmit an information provision request signal to the image management server 200 to request whether or not an object exists as the image analysis result. In addition, the external device 300 may transmit, to the image management server 200, metadata obtained by analyzing an image and/or an information provision request signal for requesting index information for the metadata.

An surveillance camera system 10 may further include a communication network 400 that is a wired/wireless communication path between the image capture device 100, the image management server 200, and/or the external device 300. The communication network 400 may include, for example, a wired network, such as LANs (Local Area Networks), WANs (Wide Area Networks), MANs (Metropolitan Area Networks), ISDNs (Integrated Service Digital Networks), and a wireless network, such as wireless LANs, CDMA, Bluetooth, and satellite communication, but the scope of the present disclosure is not limited thereto.

Figure 2:
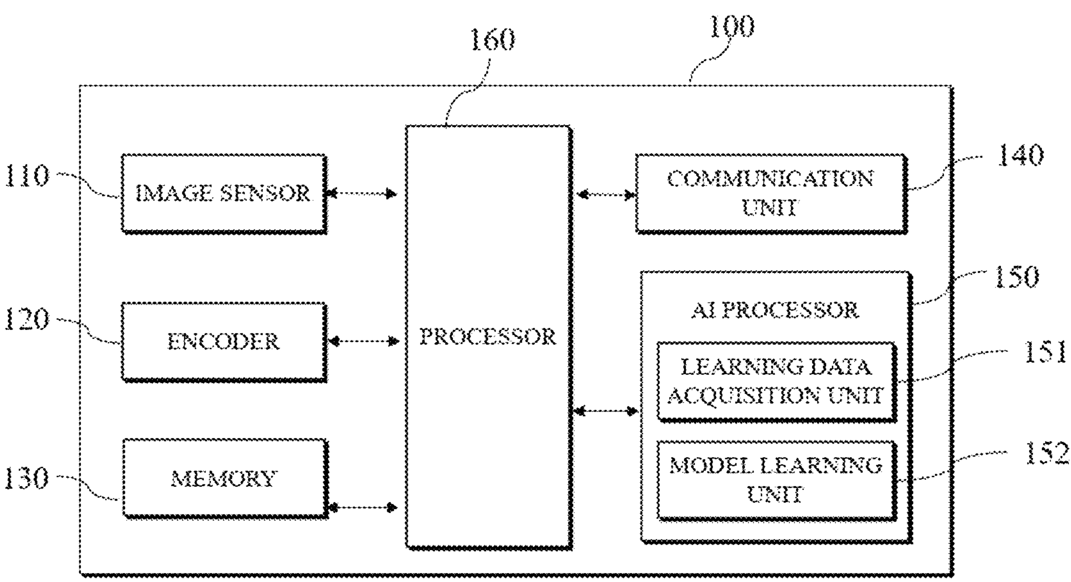
FIG. 2 is a schematic block diagram of a surveillance camera according to an embodiment of the present disclosure.

FIG. 2 is a block diagram illustrating a configuration of the surveillance camera shown in FIG. 1.

Referring to FIG. 2, as an example, a surveillance camera 100 is a network camera that performs an intelligent image analysis function and generates a signal of the image analysis, but the operation of the network surveillance camera system according to an embodiment of the present disclosure is not limited thereto.

The a surveillance camera 100 includes an image sensor 110, an encoder 120, a memory 130, a communication interface 140, an AI processor 150, a processor 160.

The image sensor 110 performs a function of acquiring an image by photographing a surveillance region, and may be implemented with, for example, a CCD (Charge-Coupled Device) sensor, a CMOS (Complementary Metal-Oxide-Semiconductor) sensor, and the like.

The encoder 120 performs an operation of encoding the image acquired through the image sensor 110 into a digital signal, based on, for example, H.264, H.265, MPEG (Moving Picture Experts Group), M-JPEG (Motion Joint Photographic Experts Group) standards or the like.

The memory 130 may store video data, audio data, still images, metadata, and the like. The metadata may include data such as object detection information (motion, sound, intrusion into designated area, etc.), object identification information (person, vehicle, face, hat, clothing, etc.), and detected location information (coordinates, size, etc.) captured in a monitoring area. In addition, the metadata may include various environmental factors, such as weather information at a time an image is captured. In addition, the metadata may also include a lighting condition at the time the image is captured. The metadata described above may be used in the vehicle color detection method according to an embodiment of the present disclosure, so that more sophisticated vehicle color detection can be performed.

In addition, the still image is generated together with the text-based metadata and stored in the memory 230, and may be generated by capturing image information for a specific analysis region among the image analysis information. For example, the still image may be implemented as a JPEG image file.

For example, the still image may be generated by cropping a specific region of the image data determined to be an identifiable object among the image data of the surveillance region detected for a specific region and a specific period, and may be transmitted in real time together with the text-based metadata.

The communication unit 140 transmits the image data, audio data, still image, and/or metadata to an image receiving/searching device, which may be or correspond to the external device 300 of FIG. 1. The communication unit 140 according to an embodiment may transmit image data, audio data, still images, and/or metadata to the image receiving/searching device in real time. The communication unit 140 may perform at least one communication function among wired and wireless LAN (Local Area Network), Wi-Fi, ZigBee, Bluetooth, and Near Field Communication. The communication unit 240 may include any one or any combination of a digital modem, a radio frequency (RF) modem, an antenna circuit, a WiFi chip, and related software and/or firmware.

The AI processor 150 is designed for an artificial intelligence image processing and applies a deep learning based object detection algorithm which is learned in the image acquired through the surveillance camera system according to an embodiment of the present disclosure. As described above, a capture device 100 disclosed in an embodiment of the present disclosure may train various models necessary for image processing to analyze characteristics of an object in an image, such as vehicle manufacturer logo detection and color detection, and apply the trained model to image processing. The capture device 100 may implement AI image processing through the operation of the AI processor 150 and/or processor 160.

The AI processor 150 may include a learning data acquisition unit 151 and a model learning unit 152.

The AI processor 150 may be mounted in an electronic device including an AI module capable of AI processing or in a server including an AI module, or may be implemented as an independent device. The AI processing may include all operations related to a controller of a surveillance camera or image management server. For example, the surveillance camera or image management server may perform AI processing on an acquired image signal to perform processing/determination and generate a control signal The AI processor 150 may be mounted and operated in a client device which directly uses AI processing results or in a cloud environment device which provides AI processing results to other devices. The AI processor 150 may be included in a computing device capable of training a neural network and may be implemented as any of various electronic devices such as a server, a desktop PC, a laptop PC, and a tablet PC.

The AI processor 150 may train a neural network to recognize data related to the surveillance camera. Here, the neural network for recognizing data related to image capture device 100 may be designed to simulate the brain structure of human on a computer and may include a plurality of network nodes having weights and simulating the neurons of human neural network. The plurality of network nodes may transmit and receive data in accordance with each connection relationship to simulate the synaptic activity of neurons in which neurons transmit and receive signals through synapses. Here, the neural network may include a deep learning model developed from a neural network model which may be an artificial neural network (ANN) model. In the deep learning model, a plurality of network nodes is positioned in different layers and may transmit and receive data in accordance with a convolution connection relationship. The neural network, for example, includes various deep learning techniques, such as deep neural networks (DNN), convolutional deep neural networks (CNN), recurrent neural networks (RNN), a restricted boltzmann machine (RBM), deep belief networks (DBN), and a deep Q-network, and may be applied to fields, such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 130 may store various programs and data for the operation of the AI processor 150. The memory 130 may be a nonvolatile memory, a volatile memory, a flash-memory, a hard disk drive (HDD), a solid state drive (SDD), or the like. The memory 130 is accessed by the AI processor 150 and reading-out/recording/correcting/deleting/updating, etc. Of data by the AI processor 150 may be performed. Further, the memory 25 may store a neural network model (e.g., a deep learning model) generated through a learning algorithm for data classification/recognition according to an embodiment of the present disclosure.

Meanwhile, the AI processor 150 may include a data learning unit that learns a neural network for data classification/recognition. The data learning unit may learn references about what learning data are used and how to classify and recognize data using the learning data in order to determine data classification/recognition. The data learning unit may learn a deep learning model by acquiring learning data to be used for learning and by applying the acquired learning data to the deep learning model.

The data learning unit may be manufactured in the type of at least one hardware chip and mounted on the surveillance camera 100. For example, the data learning unit may be manufactured in a hardware chip type only for artificial intelligence, and may be manufactured as a part of a general purpose processor (CPU) or a graphics processing unit (GPU) and mounted on the surveillance camera 100. Further, the data learning unit may be implemented as a software module. When the data leaning unit is implemented as a software module (or a program module including instructions), the software module may be stored in non-transitory computer readable media that may be read through a computer. In this case, at least one software module may be provided by an OS (operating system) or may be provided by an application.

The data learning unit may include a learning data acquisition unit 151 and a model learning unit 152.

The data learning unit may include a learning data acquiring unit 151 and a model learning unit 152.

The learning data acquisition unit 151 may acquire learning data required for a neural network model for classifying and recognizing data.

The model learning unit 152 may perform learning such that a neural network model has a determination reference about how to classify predetermined data, using the acquired learning data. In this case, the model learning unit 152 may train a neural network model through supervised learning that uses at least some of learning data as a determination reference. Alternatively, the model learning data 152 may train a neural network model through unsupervised learning that finds out a determination reference by performing learning by itself using learning data without supervision. Further, the model learning unit 152 may train a neural network model through reinforcement learning using feedback about whether the result of situation determination according to learning is correct. Further, the model learning unit 152 may train a neural network model using a learning algorithm including error back-propagation or gradient decent.

When the neural network model is trained, the model training unit 152 may store the trained neural network model in a memory. The model training unit 152 may store the trained neural network model in the memory of the server connected to the surveillance camera 100 through a wired or wireless network.

The data learning unit may further include a learning data preprocessor (not shown) and a learning data selector (not shown) to improve the analysis result of a recognition model or reduce resources or time for generating a recognition model.

The learning data preprocessor may preprocess acquired data such that the acquired data may be used in learning for situation determination. For example, the learning data preprocessor may process acquired data in a predetermined format such that the model learning unit 152 may use learning data acquired for learning for image recognition.

Further, the learning data selector may select data for learning from the learning data acquired by the learning data acquiring unit 151 or the learning data preprocessed by the preprocessor. The selected learning data may be provided to the model learning unit 152. For example, the learning data selector may select only data for objects included in a specific area as learning data by detecting the specific area in an image acquired through a camera of a vehicle.

Further, the data learning unit may further include a model estimator (not shown) to improve the analysis result of a neural network model.

The model estimator inputs estimation data to a neural network model, and when an analysis result output from the estimation data does not satisfy a predetermined reference, it may make the model learning unit 152 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator may estimate that a predetermined reference is not satisfied.

In the present disclosure, at least one of a surveillance camera, an autonomous vehicle, a user terminal, and a server may be linked to an AI module, a robot, an augmented reality (AR) device, a virtual reality (VR) device, a device related to a 5G service, and the like.

Figure 3:
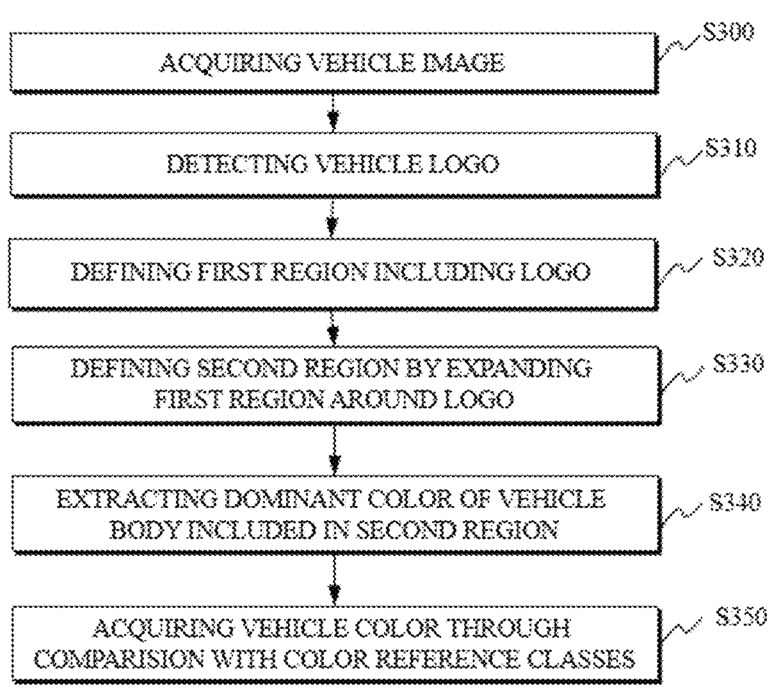
FIG. 3 is a flowchart of a method for detecting a vehicle color according to an embodiment of the present disclosure.
Figure 4:
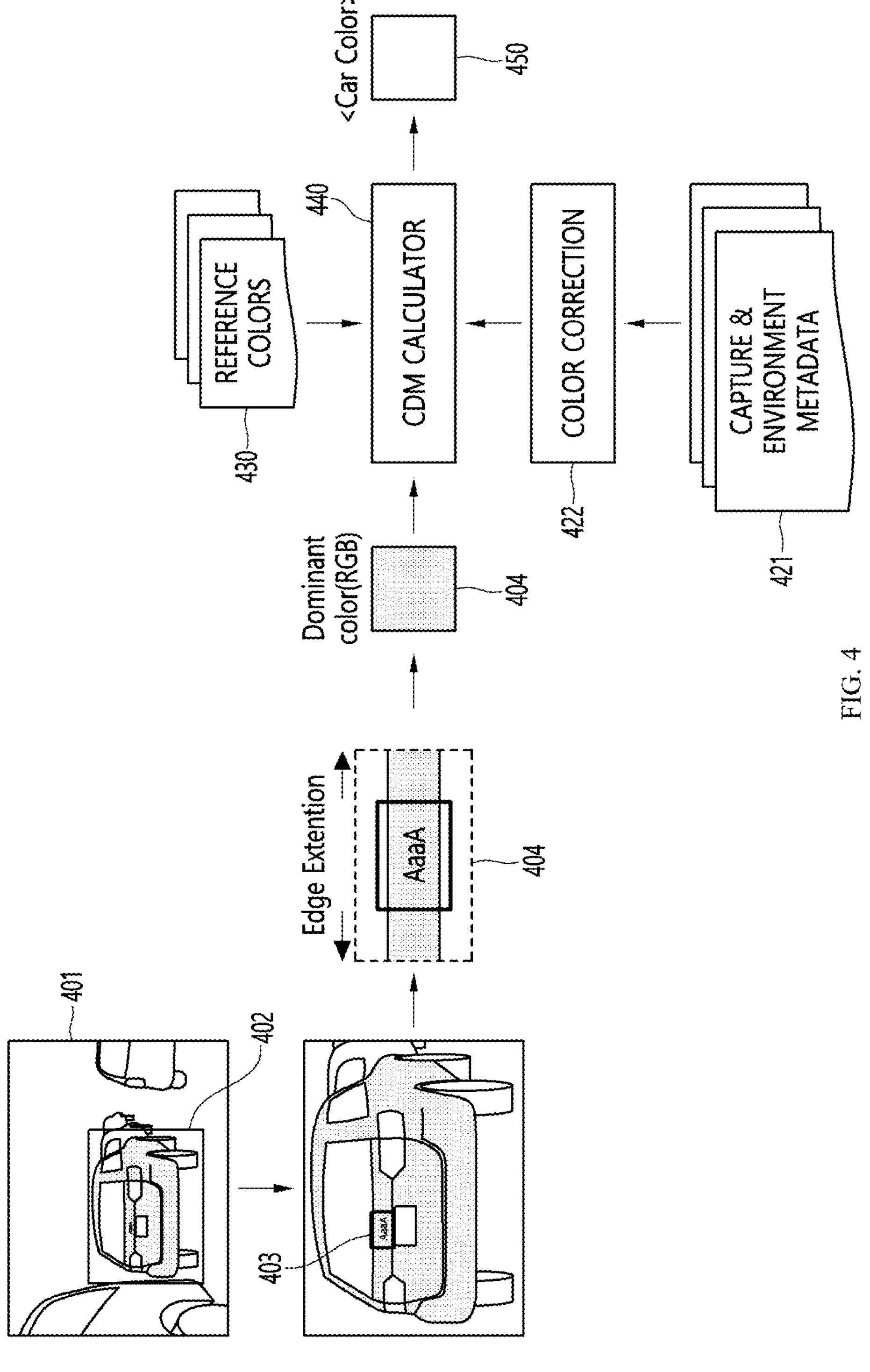
FIG. 4 is a diagram for explaining the method for detecting a vehicle color, which is shown in FIG. 3.

FIG. 3 is a flowchart of a method for detecting a vehicle color according to an embodiment of the present disclosure. FIG. 4 is a diagram for explaining the method for detecting a vehicle color, which is shown in FIG. 3. An image processing method related to vehicle color detection using vehicle logo detection shown in FIGS. 3 and 4 may be implemented through a surveillance camera system, a surveillance camera device, and a processor or controller included in the surveillance camera device described in FIGS. 1 and 2. For the convenience of explanation, the vehicle color detection method using vehicle logo detection will be explained on the premise that various functions can be controlled through the processor 160 of the surveillance camera 100 shown in FIG. 2, but aspects of the present disclosure are not limited thereto. Meanwhile, the image processing device according to an embodiment of the present disclosure may be exemplified by the surveillance camera 100, and the image processing device may include an external device (server) in addition to the surveillance camera.

Referring to FIG. 3, the processor 160 acquires an image through the image sensor 110. According to one embodiment, in order to detect a vehicle color, it is necessary to acquire an image and then determine whether a vehicle is contained in the image. However, the present disclosure will be explained assuming that an image including a vehicle (hereinafter referred to as a vehicle image) is acquired. The processor 160 acquires the vehicle image in operation S300.

The processor 160 detects the vehicle logo from the vehicle image in operation S510. The vehicle logo may include at least one of a text or symbol representing the manufacturer of the vehicle. The processor 160 may detect the vehicle logo using a known vehicle logo detection algorithm. According to one embodiment, when the processor 160 detects the vehicle logo, the processor 160 may define the boundary of the logo and define ab interior of the boundary as the first region in operation S320. According to one embodiment, the boundary may be defined as a first bounding box.

In the present disclosure, the vehicle logo rather than the entire image of the vehicle is used to solve problems such as computational load and cost in the process of detecting the vehicle color using the entire vehicle image. However, after recognizing the vehicle, the processor 160 may additionally utilize a pre-trained vehicle manufacturer detection model in the process of detecting a position of the logo from the recognized vehicle and detecting the vehicle logo. According to one embodiment, the processor 160 may first acquire vehicle manufacturer information using a vehicle manufacturer detection model that is pre-trained to recognize an entire image of a vehicle and acquire vehicle manufacturer information based on a recognition result. Therefore, before actually detecting a logo from a vehicle, a vehicle logo detecting operation is performed with pre-confirmed vehicle manufacturer information, thereby improving the efficiency of detecting the logo from the vehicle image.

In operation S330, the processor 160 may define a second region by expanding the first region defined in operation S320.

Since a logo is generally located at a specific area of a vehicle body, surroundings of the logo often include a part of the vehicle body as well when the logo is detected. Here, the vehicle body may include a hood forming the front of the vehicle, a roof of the vehicle, and side panels of the vehicle. A grille region and a light region at the front of the vehicle may be excluded from the hood. In addition, the side panels of the vehicle may refer to regions, other than window regions, that constitute doors of the vehicle. Moreover, the side panels of the vehicle may refer to regions other than wheel regions. However, since the vehicle logo may be shown at the center of each wheel supporting a tire, the center of each wheel may be included in the side panels.

The logo may be located inside the first region, and the bounding box configured to fit the boundary of the logo may be extracted as the first region. The processor 160 may extract the expanded bounding box as a second region by expanding at least one of horizontal or vertical lengths of the bounding box. The processor 160 may extract the second region by selectively expanding at least one of the horizontal or vertical lengths of the bounding box based on a horizontal and vertical ratio of the logo.

According to one embodiment, the processor 160 may select whether to expand the bounding box horizontally or vertically based on the position of the vehicle logo. For example, if the first region including the detected logo is positioned in the grille region at the front of the vehicle, the processor 160 may expand the first region vertically to define the second region. The grille region is generally configured with different visual characteristics (e.g., color, material, texture composition) from the hood at the front of the vehicle. Thus, horizontally expanding the first region defined as the grille region may increase the probability of false detection of the vehicle color. Therefore, in this case, it may be desirable to expand the first region vertically so that the hood at the front of the vehicle is included in the expanded second region. The hood at the front of the vehicle may be the most important factor in determining the vehicle color. However, a vehicle recognized through surveillance cameras may be detected from various angles, and the front part of the vehicle may not be recognized all the time Nevertheless, a vehicle logo may be recognized from various locations such as the front, rear, and sides of the vehicle, thereby reducing computational load and increasing cost-efficiency in logo detection.

The processor 160 may extract a dominant color of the vehicle body included in the second region in operation S340.

In order to extract the dominant color of the vehicle body, the processor 160 may crop the vehicle image included in the second region and determine the majority RGB value within a cropped region. According to one embodiment, the processor 160 may determine the majority RGB value through histogram analysis within the cropped region.

The processor 160 may perform color correction by adjusting the determined majority RGB value based on predefined metadata. The metadata may include at least one of the following: capture metadata including time and location information indicating when and where the image is captured, environmental factors including weather information, a lighting condition, and a user's feedback on the determined color of the vehicle.

The processor 160 may acquire the vehicle color by comparing the corrected RGB value with color reference classes in operation S350. The processor 160 may determine that a reference color closest to the corrected RGB value, which is corrected through a color distance metric, among the color reference classes is the vehicle color. Here, the color distance metric may include Euclidean distance or the HSV color model.

Hereinafter, an example of the process of detecting a vehicle color using a vehicle logo according to the present disclosure will be described with reference to FIG. 4.

Referring to FIG. 4, a processor 160 may determine whether a vehicle 402 is included in an image 401 acquired through a surveillance camera. A bounding box 402 to indicate a vehicle recognition result may also be displayed. However, in the present disclosure, a process of detecting a vehicle logo 403 is performed without extracting a vehicle color through an image processing within a bounding box area of an entire vehicle image. The processor 160 extracts a first bounding box 403 including the vehicle logo. The processor 160 may display the first bounding box 403 on an image through a display of a computing device connected to a server processing images from a local surveillance camera.

The processor 160 may extract the first bounding box 403 along the boundary of the vehicle logo "AaaA." Yet, even within the first bounding box 403, a portion of the vehicle body, other than a text constituting the vehicle logo, may also represent a color of the vehicle. However, the first bounding box 403 is not the entire vehicle image and is generally defined according to the size of the logo, a region other than the logo within the first bounding box 403 may have a relatively small proportion within the first bounding box 403. Therefore, instead of detecting the vehicle color from the region other than the logo within the first bounding box 403, expanding the first bounding box 403 to include more of the vehicle body and then detecting the vehicle color may improve the accuracy of color detection. Reflecting this necessity, the processor 160 acquires a second bounding box 404 by expanding the first bounding box 403 based on at least one of horizontal or vertical axes of the first bounding box 403.

The processor 160 determines a dominant color of the vehicle body, i.e., a majority RGB value 410, in a region of the second bounding box 404. The processor 160 performs color correction 422 by referring to metadata 421 for the majority RGB value, calculates 440 a color distance based on the color reference classes 430 for the color-corrected majority RGB value, and determines the closest color from the color reference classes bas a final vehicle color 450.

Figure 5:
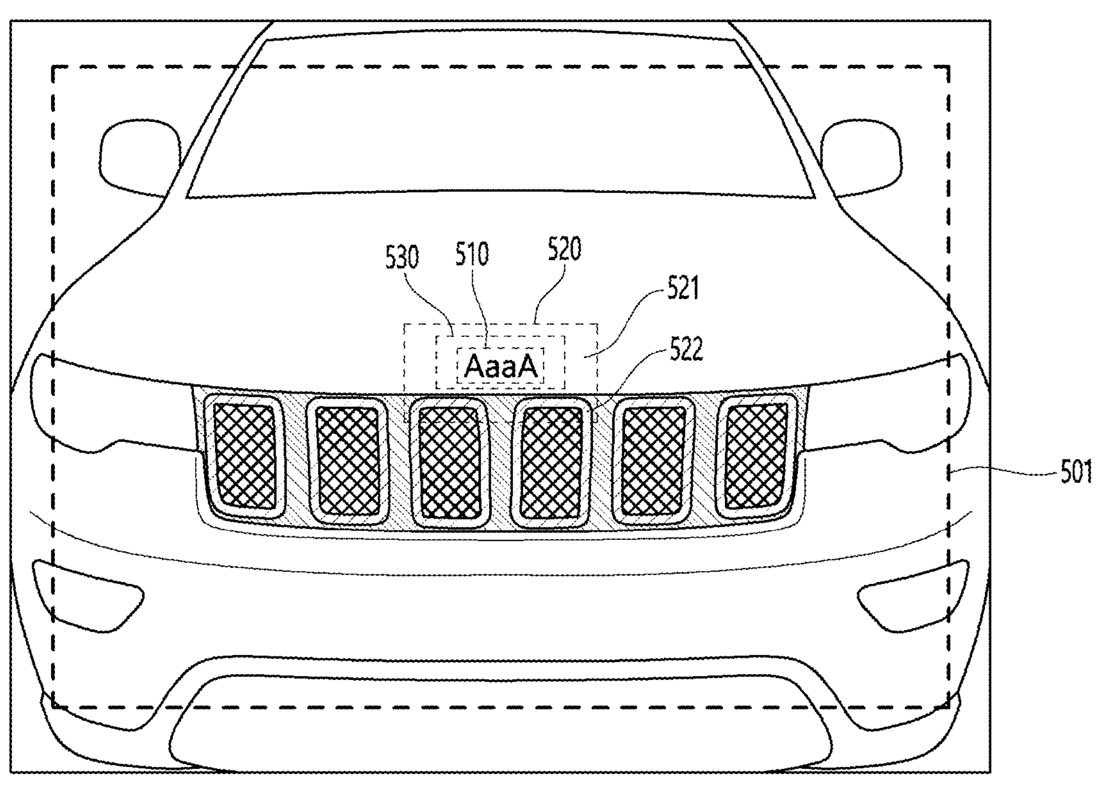
FIGS. 5 and 6 are diagrams for explaining a vehicle logo detecting process in more detail according to an embodiment of the present disclosure.
Figure 6:
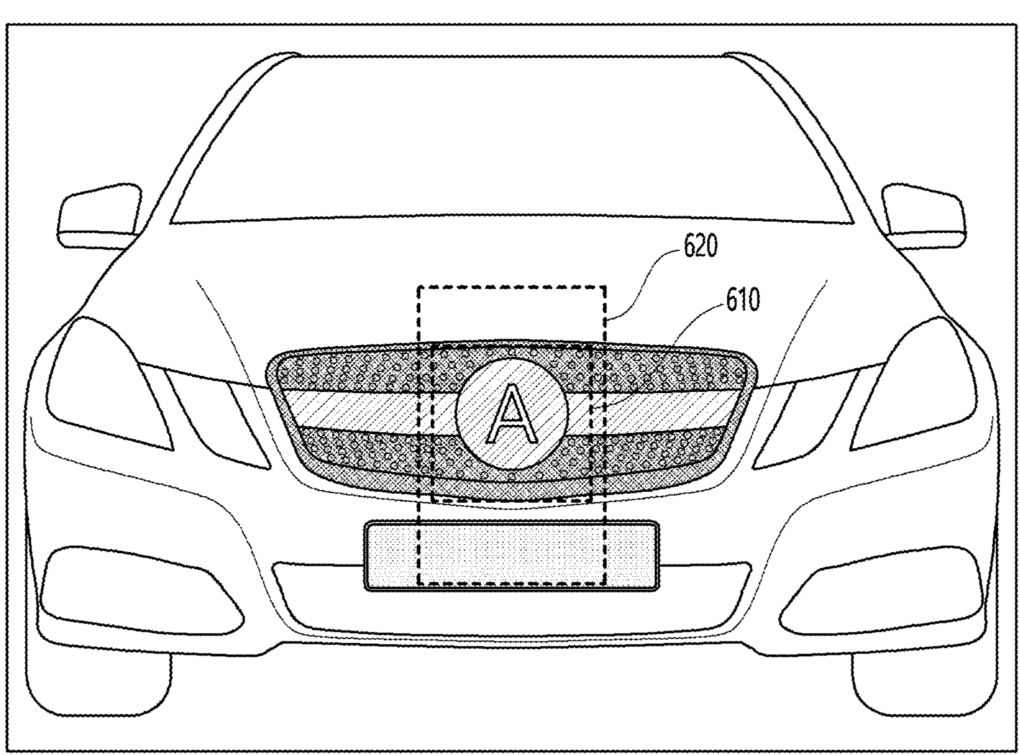

FIGS. 5 and 6 are diagrams for explaining a vehicle logo detecting process in more detail according to an embodiment of the present disclosure.

Referring to FIG. 5, upon detection of a vehicle logo (Jeep®), the processor 160 extracts a first bounding box 510 to form a boundary of the vehicle logo. The processor 160 acquires a second bounding box 520 by expanding the size of the first bounding box 510 based on at least one of horizontal or vertical axes of the first bounding box 510. A region other than the vehicle logo within the second bounding box 520 may include a hood region 521 and a grille region 522. If it is determined that the second bounding box 520 includes two regions with different attributes or features, the processor 160 may readjust the size of the second bounding box to include only the area with the same attribute or feature. For example, in the initially expanded second bounding box 520, the grille region 522 has completely different visual characteristics from those of a hood region 521. If it is determined that the two regions (521,522) are respectively the hood region and the grille region according to a preliminary scan analysis, the processor 160 may readjust the size of the initially expanded second bounding box 520 to include only the hood region, thereby acquiring a third bounding box 530.

In one embodiment, based on the analysis of specific visual characteristics such as color and material of the grille region 522 and the hood region 521, the processor 160 may acquire the third bounding box 530 that has been expanded based on a horizontal axis to include only the hood region 521.

Referring to FIG. 6, the processor 160 may acquire a second bounding box 620 by expand a first bounding box 610 including a vehicle logo along a vertical axis. In one embodiment, the processor 160 may acquire the second bounding box by selecting at least one of the horizontal or vertical axes to expand the first bounding box 610 based on a position of the detected vehicle logo. In one embodiment, if the first bounding box 610 is expanded based on the horizontal axis with the vehicle logo positioned in a grille region, the expanded second bounding box (not shown) may be likely to include only the grille region. Therefore, even if the actual vehicle color is white, expanding the first bounding box 610 based on the horizontal axis for color detection would likely result in the vehicle color being detected as black or metallic. Hence, in this case, the first bounding box 610 may be expanded vertically to form the second bounding box 620, so that the second bounding box 620 includes the hood region of the vehicle.

Figure 7:
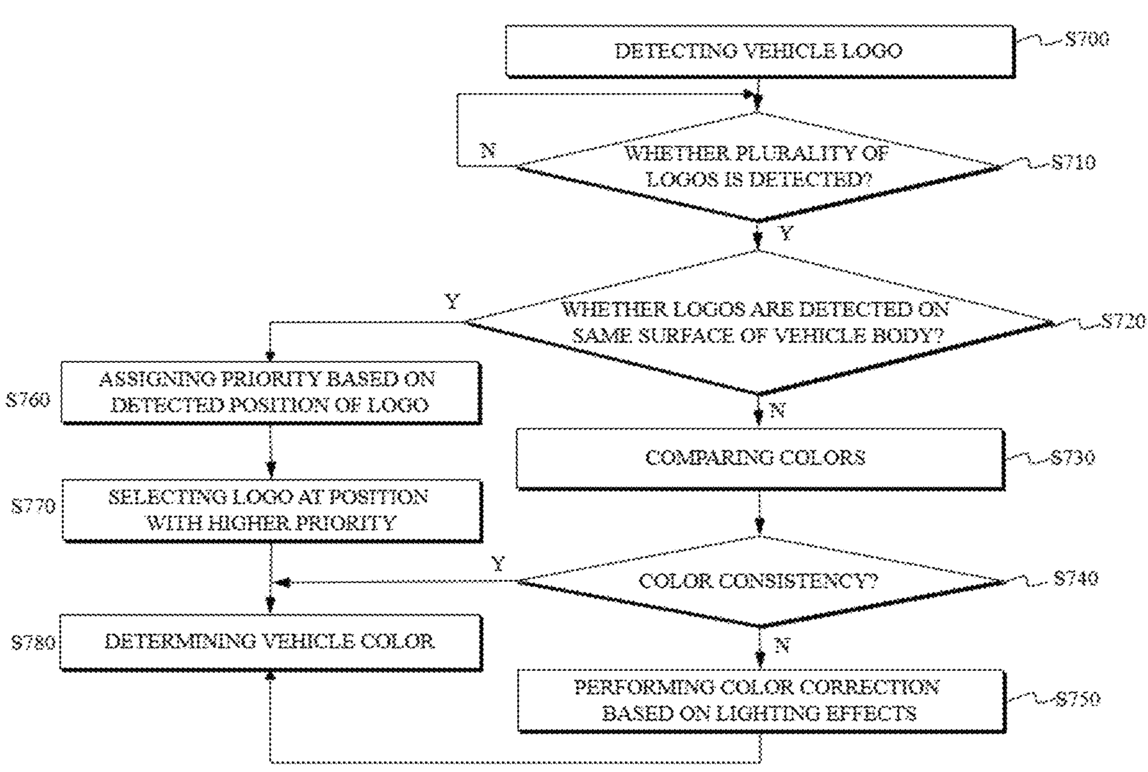
FIG. 7 is an exemplary flowchart illustrating a method for detecting a vehicle color in a case where multiple vehicle logos are detected according to an embodiment of the present disclosure.

FIG. 7 is an exemplary flowchart illustrating a method for detecting a vehicle color in a case where multiple vehicle logos are detected according to an embodiment of the present disclosure.

The processor 160 detects a vehicle logo in operation S700, and determines if the detected vehicle logo is in plural in operation S710. If a plurality of logos is detected in operation S710, the processor 160 determines whether the multiple detected logos are detected from the same surface of the vehicle body in operation S720. If the plurality of logos is detected from the same surface of the vehicle body (Yes in operation S720), the processor 160 may select one of the plurality of logos based on detected positions of the plurality of logos. The processor 160 may assign a priority based on a detected position of at least one logo in operation S760. In one embodiment, a body region of the vehicle may be assigned with a first priority compared to a window region, a wheel region, and a grille region of the vehicle based on the detected position of the logo. In another embodiment, since the window region is generally represented in black, the window region may be assigned with a lowest priority, or a logo detected in the window region may be excluded from color detection candidate regions. The processor 160 may select a logo with a high priority among the plurality of logos detected from the same side as a logo to be used for color detection in operation S770.

Figure 8:
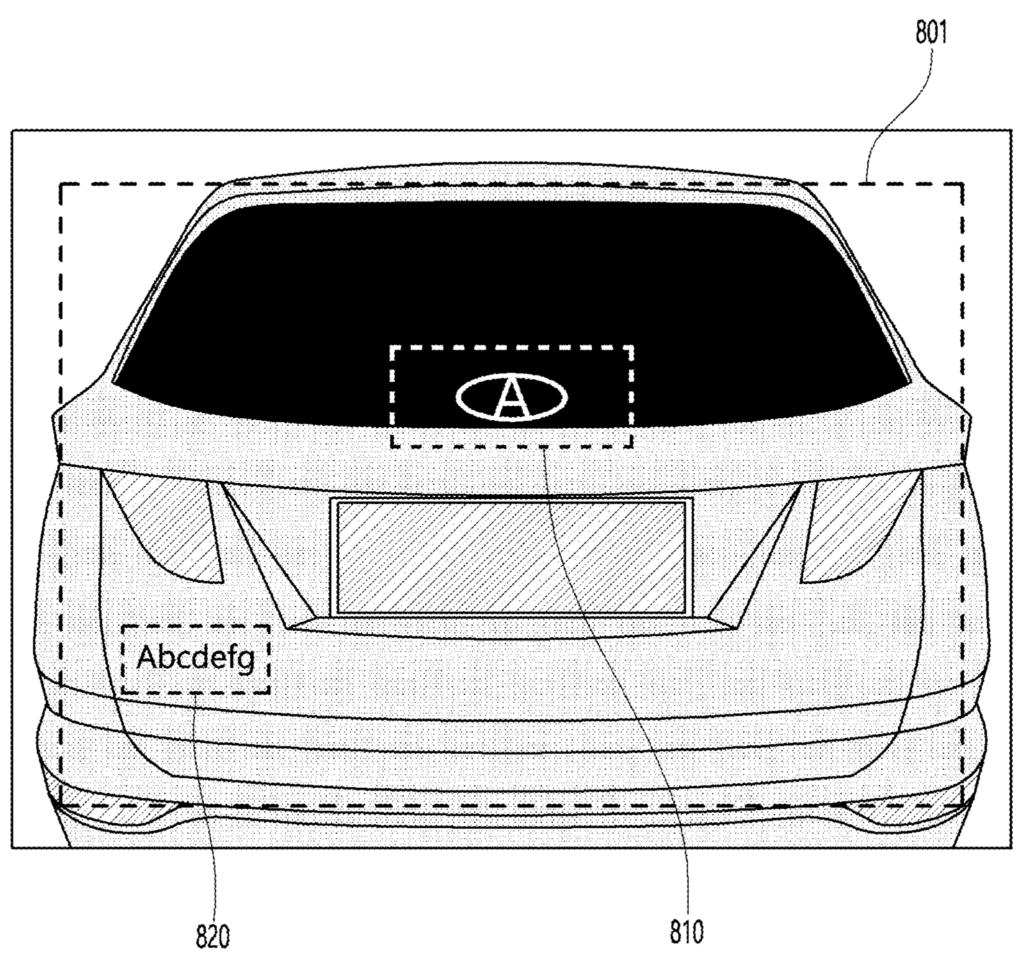
FIG. 8 is a diagram for explaining the method for detecting a vehicle color, which is shown in FIG. 7.

For example, referring to FIG. 8, the processor 160 detects two logos at a rear of a vehicle. Here, each logo may refer to a logo or text representing a vehicle manufacturer, or a combination thereof. In addition, the vehicle logo may represent a vehicle brand (for example, if the vehicle manufacturer is “Hyundai,” “Tucson” manufactured by “Hyundai” may indicate the vehicle brand). Therefore, the processor 160 may detect a first logo 810 and a second logo 820 at a rear of a vehicle, and extract a bounding box for each of the logos. The processor 160 may determine that the first logo 810 is positioned at a window region and the second logo 820 is positioned at a body region corresponding to a rear door of the vehicle. Then, the processor 160 may assign a first priority or weight to the second logo 820, allowing the second logo 820 to be used for vehicle color detection.

Referring back to FIG. 7, the processor 160 may determine that each of the multiple detected logos is not detected from the same surface of the vehicle body (No in operation S720). For example, the first logo may be detected at the rear of the vehicle, and the second logo may be detected at a side of the vehicle. In this case, the processor 160 may compare colors of the second regions corresponding to the first and second logos in operation S730. Here, a second region corresponding to each logo may refer to a region including a car body where a vehicle color can be extracted by expanding a first region of a corresponding logo, as previously described.

For some trucks or vans, various logos may be present at the rear and side of a corresponding vehicle. In this disclosure, by utilizing such redundancy of the logos, it is possible to analyze the color consistency around the logos at different positions and to address lighting variations.

The processor 160 may compare predicted color results acquired for the logos detected at different sides of the vehicle in operation S730. Here, if it is determined that there are significant discrepancies between the colors of the first and second logos within a preset range, the processor 160 may determine that there is no color consistency S740. In this case, assuming that different lighting effects are applied to the first and second logos, the processor 160 performs light-aware color correction in operation S750.

Based on the vehicle's yaw position and the sun's position on the vehicle image, the processor 160 may perform color correction on the second bounding boxes (second regions) corresponding to the first and second logos. The processor 160 may analyze the vehicle image through a pre-trained model and predict a lighting direction to enable color correction appropriate for the position of each logo.

In color correction based on the lighting direction, a weighted average may be applied to the first and second logos. For example, the processor 160 may assign a greater weight to a region receiving consistent sunlight (e.g., the rear of the vehicle facing away from the sun). In one embodiment, it is assumed that the sun is in the west and the vehicle is moving east when the image is captured. In this case, the rear of the vehicle may be a region receiving consistent lighting while the side panels of the vehicle may be areas not receiving consistent lighting due to the vehicle's rotated state or the angle of the sunlight. If the first logo is positioned at the rear of the vehicle and the second logo is positioned at the side of the vehicle, the processor 160 may assign a greater weight to the second region corresponding to the first logo.

In addition, in one embodiment, if color consistency analysis performed by the processor 160 for the first and second logos detected on both sides of the vehicle shows continuous color discrepancies, the processor 160 may refer to the vehicle manufacturer database to match the vehicle model with a possible color and determine the final vehicle color.

With reference to FIGS. 7 and 8, operation S780 of determining a final vehicle color by applying a predetermined priority or weight based on a position of each logo when a plurality of logos is detected has been described.

Hereinafter, a process of analyzing a vehicle color after vehicle logo detection is completed will be described in more detail with reference to FIG. 9.

Figure 9:
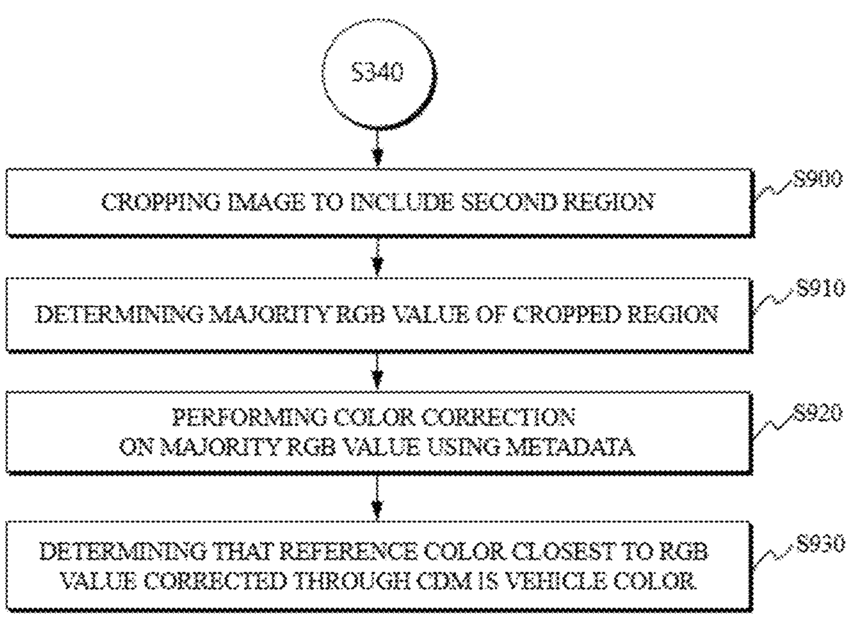
FIG. 9 is a flowchart illustrating a specific method of determining a color of a vehicle through a vehicle logo region according to an embodiment of the present disclosure.

FIG. 9 is a flowchart illustrating a specific method of determining a color of a vehicle through a vehicle logo region according to an embodiment of the present disclosure. FIG. 9 is a diagram illustrating in more detail an operation for acquiring a second region by expanding a first region including the logo in FIG. 3 and then analyzing a color of a vehicle in the second region.

In a process of extracting a dominant color of a vehicle body included in the second region in operation S340, a processor 160 may crop a vehicle image to include the second region in operation S900. Then, the processor 160 may determine a majority RGB value of a cropped region using a majority color detection technique. For example, a histogram analysis method may be applied to the majority color detection technology, but aspects of the present disclosure are not limited thereto.

When the majority RGB value of the second region are determined, the processor 160 may perform color correction on the determined majority RGB value using at least one metadata related to image capturing in operation S920.

The metadata may include at least one of the following: capture metadata including time and location information indicating when and where the image is captured, environmental factors including weather information, a lighting condition, or a user's feedback on a determined vehicle color.

The processor 160 may analyze metadata embedded in the image file, such as a timestamp or geolocation information. This is to reflect changes in the lighting condition if the capture time and geolocation information differ.

According to one embodiment, the processor 160 may use a predefined set of time-based color correction profiles corresponding to various time zones such as morning, afternoon, evening, or night. The color correction profile set may include color correction parameters according to a lighting condition related to an image capture time.

According to one embodiment, the processor 160 may use a predefined set of location-based color correction profiles corresponding to various geographic locations. The color correction profile set may reflect data for unique lighting characteristics or color temperature changes observed in various regions.

The time-based color correction profiles and location-based color correction profiles may be pre-stored in a memory of the surveillance camera device 100 of FIG. 1 or the image management server 200 of FIG. 1.

According to one embodiment, in addition to the predefined profiles such as the time-based or location-based color correction profiles described above, an adaptive color correction technique which dynamically adjusts color correction parameters based on real-time environmental factors may be applied as well. For example, on a foggy or rainy day, integrating weather data such as temperature, humidity, and atmospheric conditions may be helpful in correcting a color detection algorithm.

Meanwhile, the present disclosure is not limited to the aforementioned examples of metadata and/or color correction profiles (color correction parameters) used for color correction of the majority RGB value, but various factors may be utilized.

For example, the processor 160 may perform environmental context analysis on the surroundings of a vehicle, such as the presence of other objects, landscapes, and lighting conditions, to provide additional information on how the vehicle body color reflects the surrounding environment. By doing so, it is possible to enhance the overall understanding of vehicle color recognition.

In addition, the processor 160 may, for example, refer to trends in the popular preferences for various vehicle colors. For example, regional preferences for specific vehicle colors may be referenced.

Furthermore, the processor 160 may generate a dynamic color profile based on a user's feedback and preference. That is, the color profile may be continuously updated and improved based on the user's feedback to enhance the accuracy of vehicle color detection and classification. For example, if a user provides a feedback that a detected color is darker than a color perceived by the user, a system may adjust color correction parameters based on the user's feedback.

In addition, the processor 160 may analyze large vehicle image data sets with verified color information and learn a weighting system related to different vehicle manufacturers, models, lighting conditions, etc., thereby improving color detection accuracy.

As described above, in the present disclosure, color correction may be performed using various metadata. In operation S930, the processor 160 may determine that a reference color closest to the corrected RGB value using a color distance metric technique, is the vehicle color. As a color distance measurement, such as Euclidean distance or HSV, improves the accuracy of the color comparison, the processor 160 may accurately determine a vehicle color.

Figure 10:
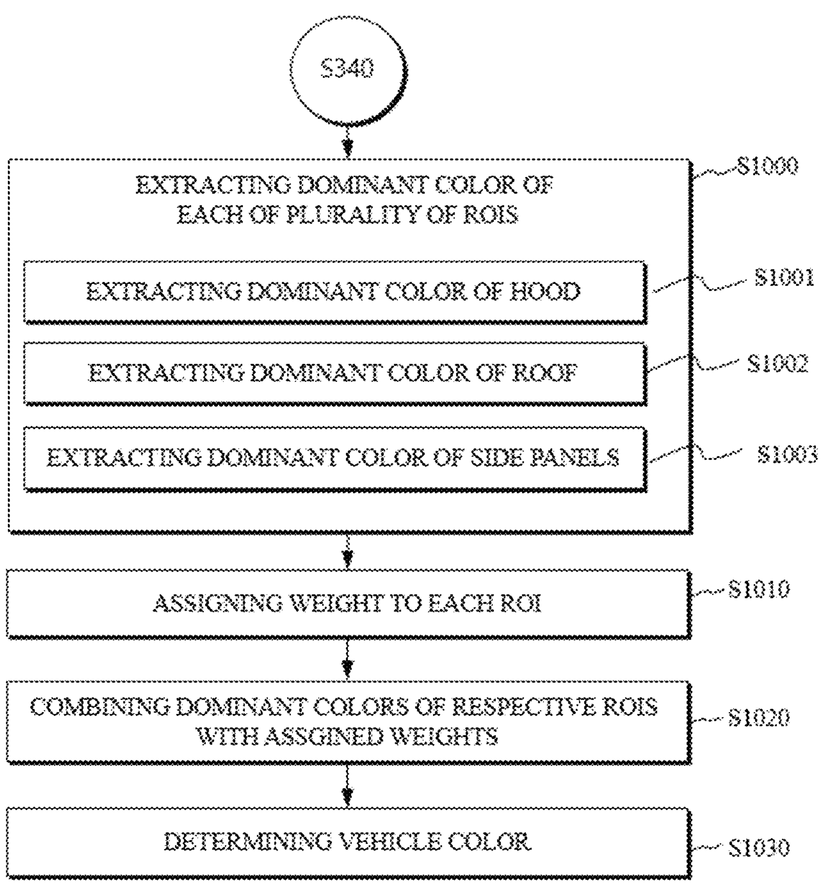
FIG. 10 is a flowchart illustrating a method of complementing vehicle color detection through setting a region of interest, which facilitates the vehicle color detection, according to an embodiment of the present disclosure.

FIG. 10 is a flowchart illustrating a method of complementing vehicle color detection through setting a region of interest, which facilitates the vehicle color detection, according to an embodiment of the present disclosure.

Referring to FIG. 10, a processor 160 may utilize a plurality of preset regions of interest (ROIs) in operation S340 of extracting a dominant color of a vehicle body included in a second region.

The processor 160 extracts the dominant color OF each of the plurality of ROIs, considering color changes in various areas of the vehicle body in operation S1000. The plurality of regions of interest may include at least one of a hood, a roof, or side panels of the vehicle. For example, the processor 160 MAY extract the dominant color of the hood in operation S1001. In addition, the processor 160 may extract a dominant color of the roof in operation S1002. Further, the processor 160 may extract a dominant color of the side panels in operation S1003.

The processor 160 may assign a weight according to characteristics of each of the plurality of ROIs in operation S1010.

Generally, the hood and roof regions may be regions where a vehicle color can be determined most accurately. The hood region is typically represented in a single color theme and generally occupies the largest area of the same color at the vehicle's front. Therefore, according to one embodiment, the highest weight may be assigned to the hood region that forms the vehicle's front. Meanwhile, the roof region also occupies a significant portion of the vehicle body. However, various additional devices may be installed at the roof region, and if a sunroof is added, the roof region may be divided into multiple colored regions. Therefore, the roof region may be assigned a smaller weight than the hood region. In addition, vehicle doors are present in the vehicle's side panels, and the bodies of the doors may represent the vehicle's dominant color, but the windows of the doors may be excluded from a vehicle color determination process. Therefore, the side panels may be assigned a relatively smaller weight than the hood and roof regions.

The processor 160 may combining the dominant colors corresponding to the respective ROIs with the assigned weights in S1020. The processor 160 may combine the dominant colors of the respective ROIs and, based on the weights assigned to the colors according to the significance of the colors, generate a weighted color representation that provides a more accurate and detailed description of the vehicle color.

Figure 11:
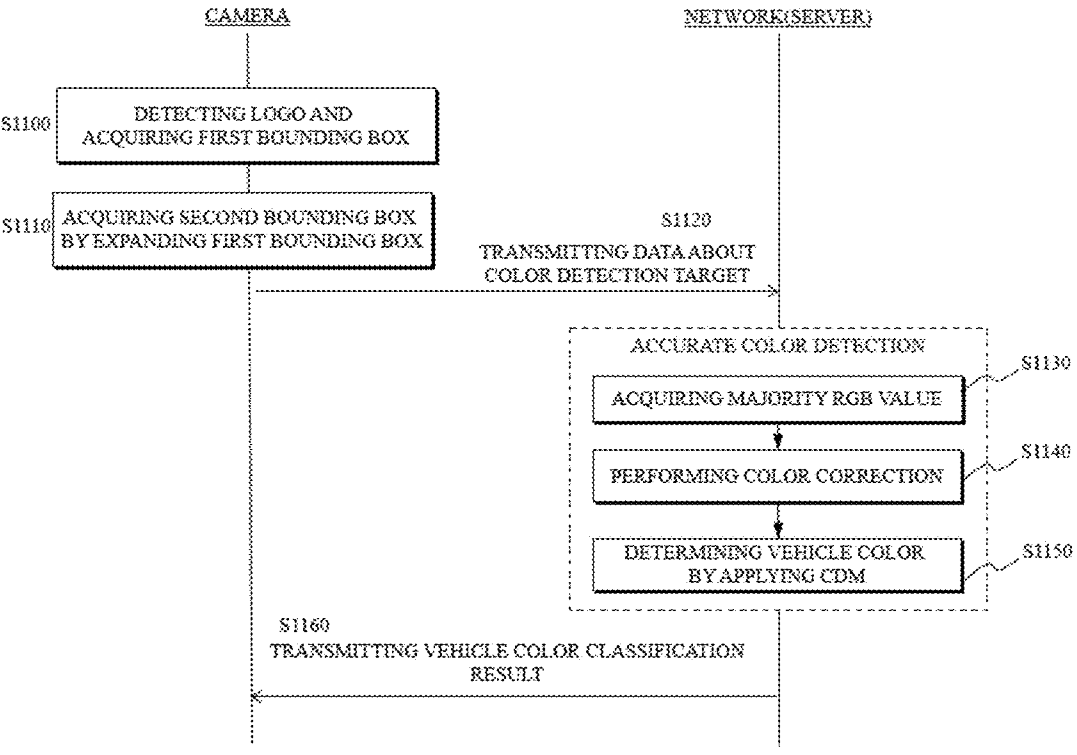
FIG. 11 is an example flowchart illustrating a process of detecting a vehicle color in an edge environment surveillance camera and cloud computing server environment according to an embodiment of the present disclosure.

FIG. 11 is an example flowchart illustrating a process of detecting a vehicle color in an edge environment surveillance camera and cloud computing server environment according to an embodiment of the present disclosure.

Referring to FIG. 11, in the present disclosure, in order to detect a vehicle color, detecting a vehicle logo, expanding a region of the detected logo, and detecting the vehicle color in the expanded bounding box may be performed in an edge environment of a local surveillance camera. However, the operation of detecting a vehicle color according to an embodiment of the present disclosure may also be performed in a system where edge and cloud environments are combined.

According to one embodiment of the present disclosure, a surveillance camera detects a vehicle logo and extracts a first bounding box including the vehicle logo in operation S1100. Then, the surveillance camera may acquire a second bounding box by expanding the first bounding box in at least one of horizontal or vertical directions, in operation S1110. When resources of the surveillance camera are limited, after the second bounding box corresponding to a color detection target is acquired, data about the color detection target may be transmitted to an external image management server in operation S1120. In this case, the surveillance camera may transmit metadata related to image capturing, along with the data about the color detection target.

The image management server may perform a more accurate color detection operation based on the data about the color detection target received from the surveillance camera. The image management server acquires a majority RGB value within the second bounding box area in operation S1130 and performs color correction based on the metadata related to image capturing in operation S1140. In operation S1150, the image management server may determine the car color by selecting a reference color with the closed color distance to the color-corrected majority RGB value.

The image management server may transmit a vehicle color classification result back to the surveillance camera device in operation S1160. This allows the vehicle color detection operation to be jointly performed with a cloud system when the resources of a local camera device in an edge environment are limited.

Meanwhile, to solve the problem of resource limitations in the surveillance camera device and to reduce redundant calculations, the processor 160 of the surveillance camera device may store mapping information between a detected vehicle logo and an acquired vehicle color in cache memory. The information stored in the camera's cache memory may be used for efficient color classification if the same vehicle manufacturer or model is detected in the future. In this case, it is possible to reduce dependence on the cloud system and save resources.

According to another embodiment of the present disclosure, if the vehicle logo detection fails in the process of extracting a vehicle color using vehicle logo detection, at least one preset Region of Interest (ROI) may be extracted through random sampling, and a vehicle color may be acquired based on the at least one extracted ROI. The at least one ROI may include at least one of an edge area, a hood, a roof, or side panels of a vehicle body. That is, the hood region of the vehicle's front, which occupies a large area of the vehicle body, may be the most important area in detecting the vehicle's color.

If a vehicle logo is not found or detected in an image or image sequence, various processes for detecting a vehicle color through the following embodiments can be considered. If the vehicle logo detection fails, a vehicle color detection operation may be performed in various ways.

For example, the processor 160 may randomly sample ROIs of the vehicle. Alternatively, the surveillance camera may generate ROIs in the vehicle body and prioritize areas most likely to represent the vehicle. As described above, the front hood of the vehicle and the roof of the vehicle may be areas with high priorities. In addition, the processor 160 may recognize the vehicle body by detecting edges of the vehicle body in the vehicle image.

In addition, for example, the processor 160 may also extract various sets of ROIs through a combination of random sampling and predefined priority area sampling, and utilize the extracted various sets of ROIs in color analysis.

In addition, for example, the processor 160 may detect a dominant color of each ROI based on a confidence score. The confidence score may be calculated based on a size of a corresponding ROI, proximity to a detected edge area, and the position of the corresponding ROI within a bounding box. An ROI with a high confidence score may be given a greater weight in final color analysis.

For example, the processor 160 may consider each ROI over multiple frames and analyze the consistency of color extracted from the corresponding ROI within the multiple frames. Then, the processor 160 may then select a most frequently detected color as a representative color. In addition, by using outlier detection techniques, the processor 160 may identify and remove any inconsistent color caused by a background element or lighting variations.

In addition, for example, if the logo detection fails, the processor 160 may analyze the vehicle's visual features, such as shape, edge, and size of the vehicle. The processor 160 may, based on visual feature comparison, search for a visually most similar vehicle in a dataset where colors are known, and predict the color of a vehicle without a logo, the vehicle which is statistically similar to the color of the visually similar vehicle in the dataset.

In addition, for example, if logo detection fails and color consistency cannot be determined, the processor 160 may provide a user or camera administrator with a series of images or overlapping frames including the vehicle. In doing so, crowdsourcing may also be applied in a manner in which a user votes for the most likely color based on combined information on the frames.

Figure 12:
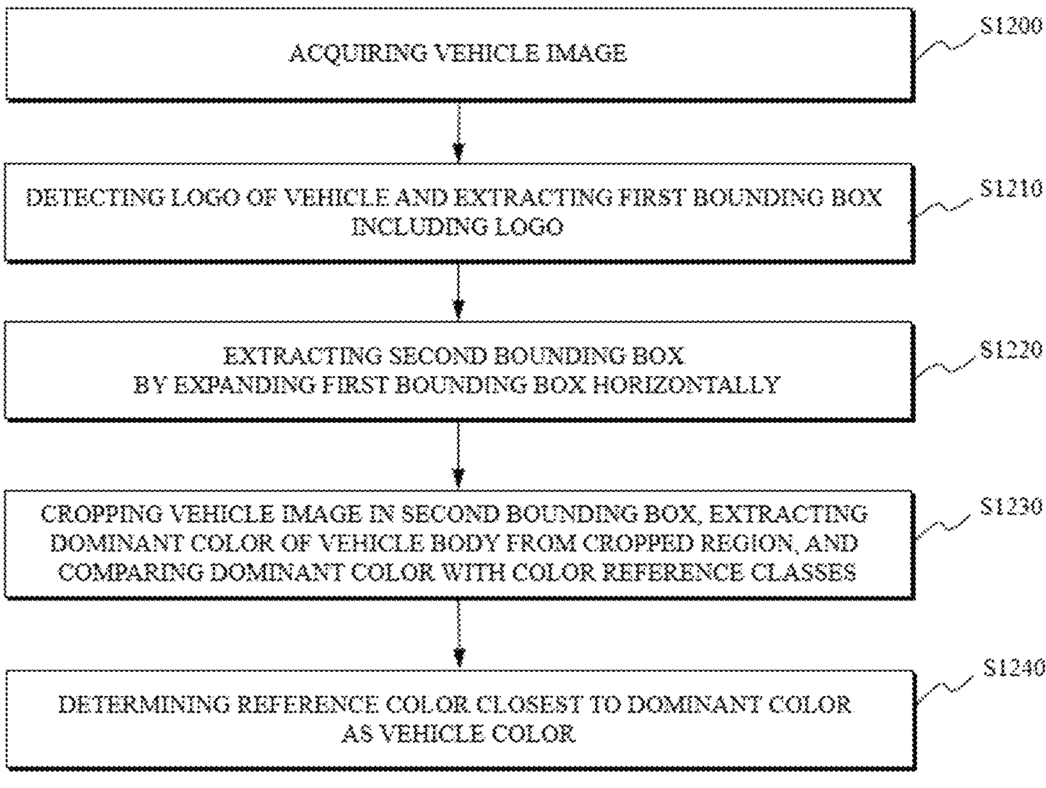
FIG. 12 is a flowchart illustrating a vehicle color detecting method according to another embodiment of the present disclosure.

FIG. 12 is a flowchart illustrating a vehicle color detecting method according to another embodiment of the present disclosure.

Referring to FIG. 12, a processor 160 may acquire a vehicle image in operation S1200, detects a logo of a vehicle in the vehicle image, and extract a first bounding box including the logo in operation S1210. The processor 160 may extract a second bounding box by expanding the first bounding box based on a horizontal axis to include at least part of a vehicle body in operation S1220. The processor 160 may crop the vehicle image in the second bounding box, extract a dominant color of the vehicle body in a cropped region, and compare the dominant color with color reference classes in operation S1230. The processor 160 may determine that a reference color closest to the dominant color in the color reference classes is a color of the vehicle in operation S1240.

The logo of the vehicle may be detected through a logo detection model. The logo detection model may be trained and stored in a memory to receive training data such as the vehicle's manufacturer, shape, brand, color, and the like and detect a logo in an image including a vehicle.

The present disclosure described above may be implemented in computer-readable codes in a computer readable recording medium. The computer readable recording medium may include all kinds of recording devices for storing data that is readable by a computer system. Examples of the computer readable recording medium include HDD (Hard Disk Drive), SSD (Solid State Disk), SDD (Silicon Disk Drive), ROM, RAM, CD-ROM, magnetic tape, floppy disk, optical data storage device, and the like, and may be implemented in the form of carrier waves (e.g., transmission over the internet). Therefore, the foregoing detailed description should not be interpreted as restrictive in all aspects, and should be considered as illustrative. The scope of the present disclosure should be determined by rational interpretation of the appended claims, and all changes within the equivalent scope of the present disclosure are included in the scope of the present disclosure.

What is claimed is:

1. A surveillance camera comprising:

an image sensor configured to acquire an image including a vehicle; and a processor configured to:

define a first region including a logo of the vehicle by detecting the logo of the vehicle from the image, define a second region by expanding the first region to include a portion of a body of the vehicle, extract a dominant color of the body of the vehicle based on the portion of the body of the vehicle included in the second region, and compare the extracted dominant color with color reference classes to acquire a color of the vehicle, wherein mapping information between the logo of the vehicle and the acquired color of the vehicle is stored in a cache memory of the surveillance camera, and wherein the processor is configured to acquire color information of the vehicle using the cached mapping information for different vehicles of a same vehicle model.

2. The surveillance camera of claim 1, further comprising a memory configured to store a pre-trained logo detection model, wherein the processor is configured to detect the logo through the logo detection model.

3. The surveillance camera of claim 1, wherein the logo comprises at least one of a text or a symbol representing a manufacturer of the vehicle, wherein the processor is configured to extract a first bounding box configured to fit a boundary of the logo as the first region, and extracts a second bounding box by extending at least one of a horizontal length or vertical length of the first bounding box.

4. The surveillance camera of claim 3, wherein the processor is configured to extract the second region by selectively extending at least one of the horizontal length or vertical length of the bounding box based on a horizontal and vertical ratio of the logo.

5. The surveillance camera of claim 1, wherein when the first region including the detected logo is positioned at a grill of a front part of the vehicle, the processor is configured to define the second region by expanding the first region vertically.

6. The surveillance camera of claim 1, wherein when the logo is a plurality of logos detected at a plurality of areas, the processor is configured to select any one of the plurality of logos based on detected positions of the plurality of logos and define the first region corresponding to the selected logo, and a body region of the vehicle is assigned with a higher priority compared to a window region, a wheel region, and a grille region of the vehicle.

7. The surveillance camera of claim 1, wherein when the detected logo is a plurality of logos detected at different sides of the body of the vehicle, the processor is configured to compare colors corresponding to the plurality of logos and acquired in the second region, and wherein when, according to a result of the comparison, it is determined that the acquired colors are out of color consistency, the processor is configured to determine that there is a difference in lighting effects on the body of the vehicle where the plurality of logos is detected, and then the processor is configured to perform color correction based on the lighting effects.

8. The surveillance camera of claim 1, wherein the processor is configured to crop the image to include the second region and determine a majority RGB value within a cropped region.

9. The surveillance camera of claim 8, wherein the processor is configured to perform color correction on the determined majority RGB value based on metadata related to image capturing, and wherein the metadata comprises at least one of the following: capture metadata comprising time and location information indicating when and where the image is captured, environmental factors including weather information, a lighting condition, or a user's feedback on the determined color of the vehicle.

10. The surveillance camera of claim 9, wherein the processor is configured to determine that a reference color closest to a corrected RGB value, which is corrected through a color distance metric, in the color reference classes is the color of the vehicle.

11. The surveillance camera of claim 1, wherein the processor is configured to extract the dominant color of each of a plurality of predefined regions of interest (ROIs), assign weights to the ROIs based on characteristics of the respective ROIs, and combine dominant colors corresponding to the weighted ROIs to acquire a color of the vehicle.

12. The surveillance camera of claim 11, wherein the plurality of ROIs comprises at least one of a hood, roof, or side panels of the vehicle.

13. The surveillance camera of claim 11, wherein the weights are assigned differently according to an area occupied by each of the plurality of ROIs on the body of the vehicle.

14. The surveillance camera of claim 1, further comprising a memory configured to store a color classification model predefined for each vehicle manufacturer, wherein the processor is configured to use a color classification model for the vehicle's manufacturer matching the detected logo as the color reference classes.

15. The surveillance camera of claim 1, further comprising a communication unit, wherein the processor is configured to transmit an image including the vehicle to an image management server through the communication unit and receive classified color information of the vehicle from the image management server.

16. The surveillance camera of claim 1, wherein when failing to detect the logo of the vehicle in the image, the processor is configured to extract at least one predefined region of interest (ROI) through random sampling and acquire a color of the vehicle based on the extracted ROI, and wherein the predefined ROI comprises at least one of an edge area, hood, roof, or side panels of the body of the vehicle.

17. A method for detecting a color of a vehicle using vehicle logo detection, the method comprising:

acquiring an image including the vehicle;

detecting a logo of the vehicle in the image and extracting a first bounding box including the logo of the vehicle;

extracting a second bounding box to include at least a portion of a body of the vehicle by expanding the first bounding box based on a horizontal axis;

cropping the portion of the body in the second bounding box, extracting a dominant color of the body of the vehicle from the cropped portion of the body, and comparing the extracted dominant color with color reference classes; and determining that a reference color closest to the dominant color in the color reference classes is the color of the vehicle, wherein the method further comprises:

storing mapping information between the logo of the vehicle and the acquired color of the vehicle in a cache memory of a surveillance camera, and acquiring color information of the vehicle using the cached mapping information for different vehicles of a same vehicle model.

18. The method of claim 17, wherein the logo of the vehicle is detected through a logo detection model, and wherein the logo detection model is trained and stored in a memory to receive training data, the training data comprising the vehicle's manufacturer, shape, brand, and color and detect the logo in the image including the vehicle.

19. The method of claim 17, further comprising:

determining a majority RGB value of the cropped vehicle image in the second bounding box;

performing color correction on the determined majority RGB value based on capture metadata including time and location information indicating when and where the image is captured, environmental factors including weather information, a lighting condition, and a user's feedback on the determined color of the vehicle; and determining that a reference color closest to a corrected RGB value, which is corrected.

* * * * *